United States Patent
Babu et al.

(10) Patent No.: US 11,907,692 B2
(45) Date of Patent: Feb. 20, 2024

(54) SYSTEM AND METHOD FOR RETRIEVAL AND GENERATION OF GRAPHICAL USER INTERFACE DEPICTING OF GRAPHICS ASSOCIATED WITH RULES-BASED DATA MANAGEMENT

(71) Applicant: BANK OF AMERICA CORPORATION, Charlotte, NC (US)

(72) Inventors: Vijaybabu Eswari Rajan Babu, Harrisburg, NC (US); Pratikshaben Patel, Fort Mill, SC (US); Qian Wen, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 11 days.

(21) Appl. No.: 17/872,358

(22) Filed: Jul. 25, 2022

(65) Prior Publication Data

US 2024/0028314 A1    Jan. 25, 2024

(51) Int. Cl.
  *G06F 8/41*    (2018.01)
  *G06N 5/025*    (2023.01)

(52) U.S. Cl.
  CPC .............. *G06F 8/433* (2013.01); *G06F 8/45* (2013.01); *G06N 5/025* (2013.01)

(58) Field of Classification Search
  None
  See application file for complete search history.

(56) References Cited

U.S. PATENT DOCUMENTS

| | | | |
|---|---|---|---|
| 8,452,786 B2 | 5/2013 | Klinker et al. | |
| 9,569,869 B2 | 2/2017 | Hesse et al. | |
| 9,600,772 B1 * | 3/2017 | Hilley | G06N 5/025 |
| 9,824,322 B2 | 11/2017 | Favre et al. | |
| 9,852,382 B2 | 12/2017 | Rangaswamy et al. | |
| 10,228,826 B1 | 3/2019 | Belgaonkar et al. | |
| 10,460,042 B2 | 10/2019 | Byron et al. | |
| 10,628,777 B2 | 4/2020 | Hull et al. | |
| 10,846,644 B2 | 11/2020 | Hull et al. | |
| 10,936,988 B2 | 3/2021 | Hull et al. | |
| 11,042,273 B1 | 6/2021 | Belgaonkar et al. | |
| 11,403,347 B2 | 8/2022 | Mahanta et al. | |
| 11,537,369 B2 * | 12/2022 | Allan | G06F 8/4452 |
| 2003/0236693 A1 | 12/2003 | Chen et al. | |
| 2005/0012743 A1 * | 1/2005 | Kapler | G06F 16/444 |
| | | | 345/419 |

(Continued)

*Primary Examiner* — Ryan D. Coyer
(74) *Attorney, Agent, or Firm* — Moore & Van Allen PLLC; Andrew T. Wood

(57) ABSTRACT

Systems, computer program products, and methods are described herein for retrieval and generation of graphical user interface depicting of graphics associated with rules-based data management. The present invention is configured to electronically receive a request from a user for a chart of process data, wherein the chart of the process data represents the corresponding process data most recently saved in a storage device, electronically receive the process data from a rule data management system and export the chart of the process data. Each of the modules and dependency data are received as inputs, and thereafter the chart displays each of the modules and corresponding module generic descriptions, rule data and corresponding rule generic descriptions, and an execution order.

17 Claims, 6 Drawing Sheets

(56) References Cited

U.S. PATENT DOCUMENTS

| | | | |
|---|---|---|---|
| 2006/0238538 A1* | 10/2006 | Kapler | G06Q 10/10 345/440 |
| 2008/0228688 A1* | 9/2008 | Liu | G06N 5/025 706/48 |
| 2009/0164879 A1* | 6/2009 | Peretti | G06Q 10/06 715/211 |
| 2010/0106546 A1 | 4/2010 | Sproule | |
| 2013/0339922 A1 | 12/2013 | Sproule | |
| 2016/0149763 A1* | 5/2016 | Ingram | H04L 41/22 709/224 |
| 2019/0171425 A1* | 6/2019 | Dempsey | G06F 8/36 |
| 2020/0167800 A1 | 5/2020 | Stewart et al. | |
| 2021/0294585 A1* | 9/2021 | Lee | G06N 3/105 |
| 2022/0113951 A1* | 4/2022 | Casaregola | G06F 8/433 |

* cited by examiner

SYSTEM AND METHOD FOR RETRIEVAL AND GENERATION OF GRAPHICAL USER INTERFACE DEPICTING OF GRAPHICS ASSOCIATED WITH RULES-BASED DATA MANAGEMENT

FIELD OF THE INVENTION

The present invention embraces a system for retrieval and generation of graphical user interface depicting of graphics associated with rules-based data management.

BACKGROUND

Currently, documentation of process data within an entity may be generated manually. However, process data and accompanying rule data are generally updated, changed, or otherwise modified on a frequent basis, leading to outdated documentation of the process data. Furthermore, the users who implement such changes to process data and rule data are accustomed to viewing computer code which govern such data. This computer code must then be translated for interpretation by users who are not familiar with such computer code, possibly leading to errors in translation. As such, there is a need for a system and method for retrieval and generation of graphical user interface depicting of graphics associated with rules-based data management.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later. Embodiments of the invention are directed to a system, method, or computer program product for retrieval and generation of graphical user interface depicting of graphics associated with rules-based data management, the invention comprising electronically receiving a request from a user for a chart of process data, wherein the chart of the process data represents the corresponding process data most recently saved in the at least one non-transitory storage device, and wherein the process data comprises one or more modules, electronically receiving the process data from a rule data management system, and exporting the chart of the process data, wherein the system receives each of the one or more modules and dependency data as inputs, and thereafter the chart displays each of the one or more modules and corresponding module generic descriptions, one or more rule data and corresponding rule generic descriptions, and an execution order.

In some embodiments, the rule data management system is configured to electronically receive the one or more rule data and the one or more modules, store the one or more rule data in a rule definition table, store the one or more modules in a module table, wherein the module table comprises module identifiers each corresponding to the one or more modules, and wherein the module table is configured to communicate with other systems, define the process data, the process data comprising the one or more modules, wherein the one or more modules comprise the one or more rule data, and wherein a module rule table is configured to match the one or more rule data with the one or more modules, and define the dependency data in a dependency table, the dependency data comprising interdependencies between the one or more modules.

In some embodiments, or in combination with any of the previous embodiments, the rule data management system is further configured to store in an optionality table a grouping of modules and a sequence of modules for the process data, wherein the optionality table comprises an optionality index, and store in a module optionality table the optionality index and the module identifiers.

In some embodiments, or in combination with any of the previous embodiments the rule data management system is configured to store a plurality of process data.

In some embodiments, or in combination with any of the previous embodiments, the rule data management system is further configured to receive, from the user, the module generic descriptions for the one or more modules, and store the module generic description in the module table.

In some embodiments, or in combination with any of the previous embodiments, the rule data management system is further configured to receive, from the user, the rule generic descriptions for the one or more rule data, and store the rule generic description in the rule definition table.

In some embodiments, or in combination with any of the previous embodiments, the interdependencies are defined as the one or more modules in parallel, series, or neither.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
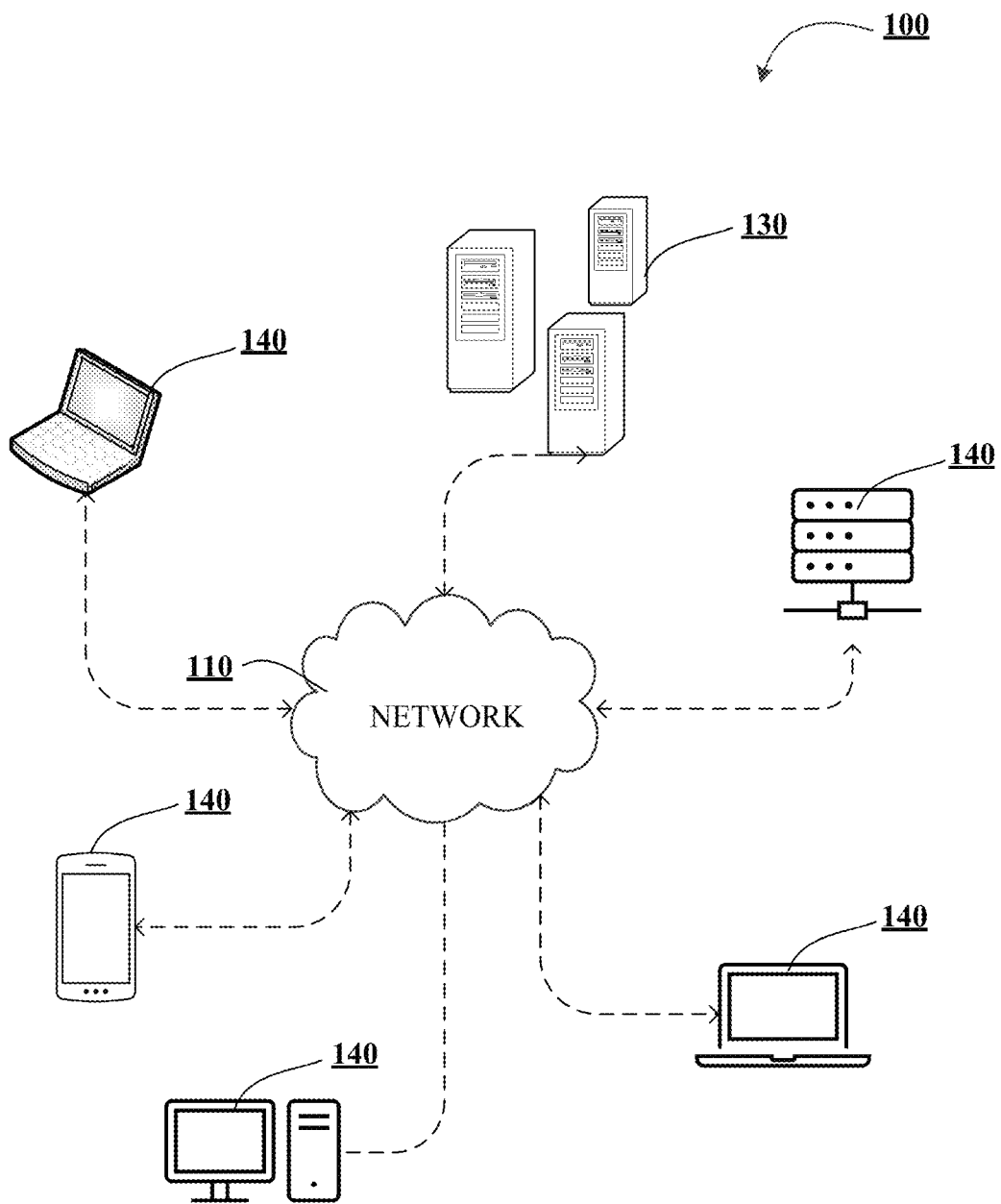
Figure 1B:
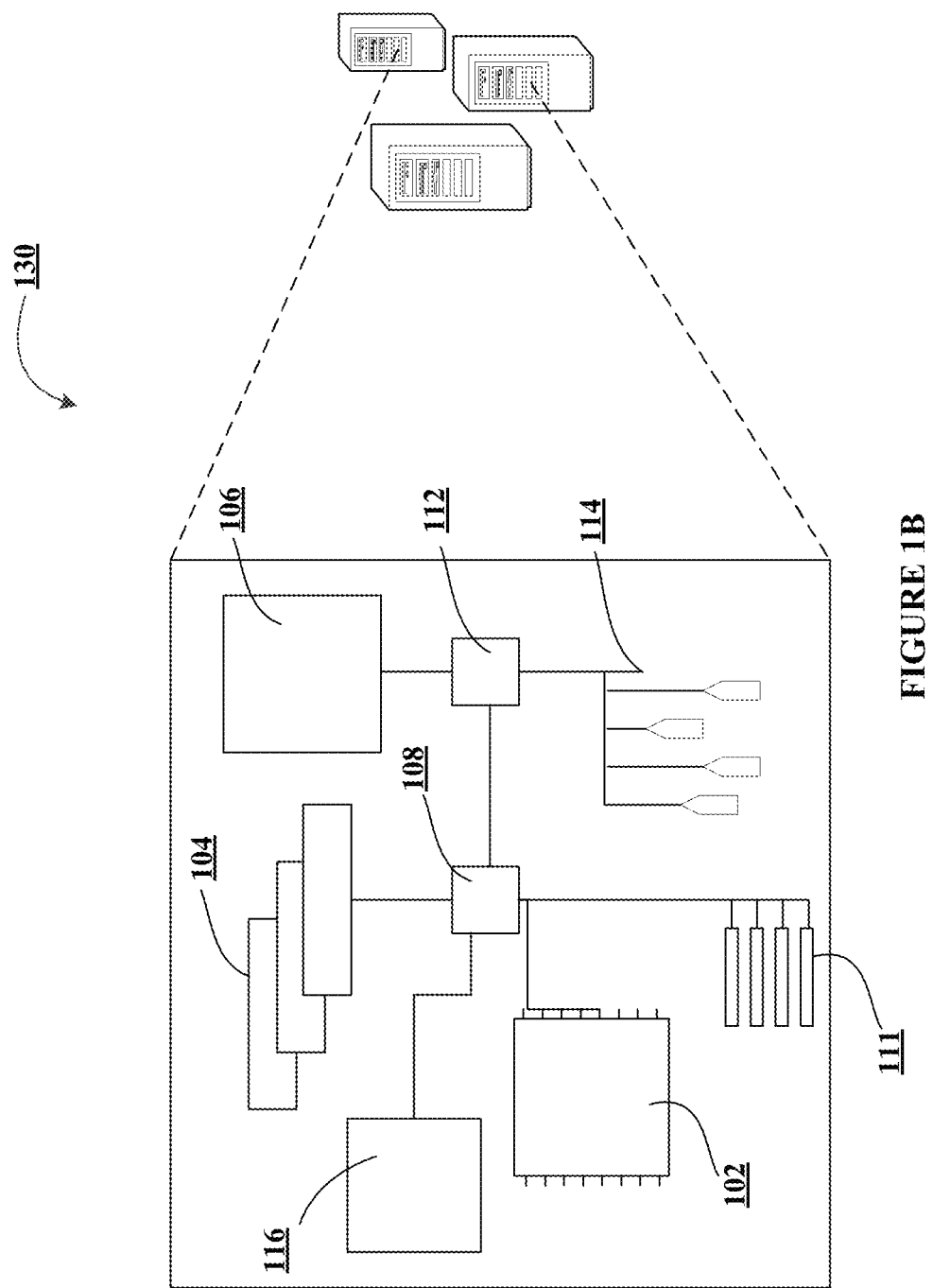
Figure 1C:
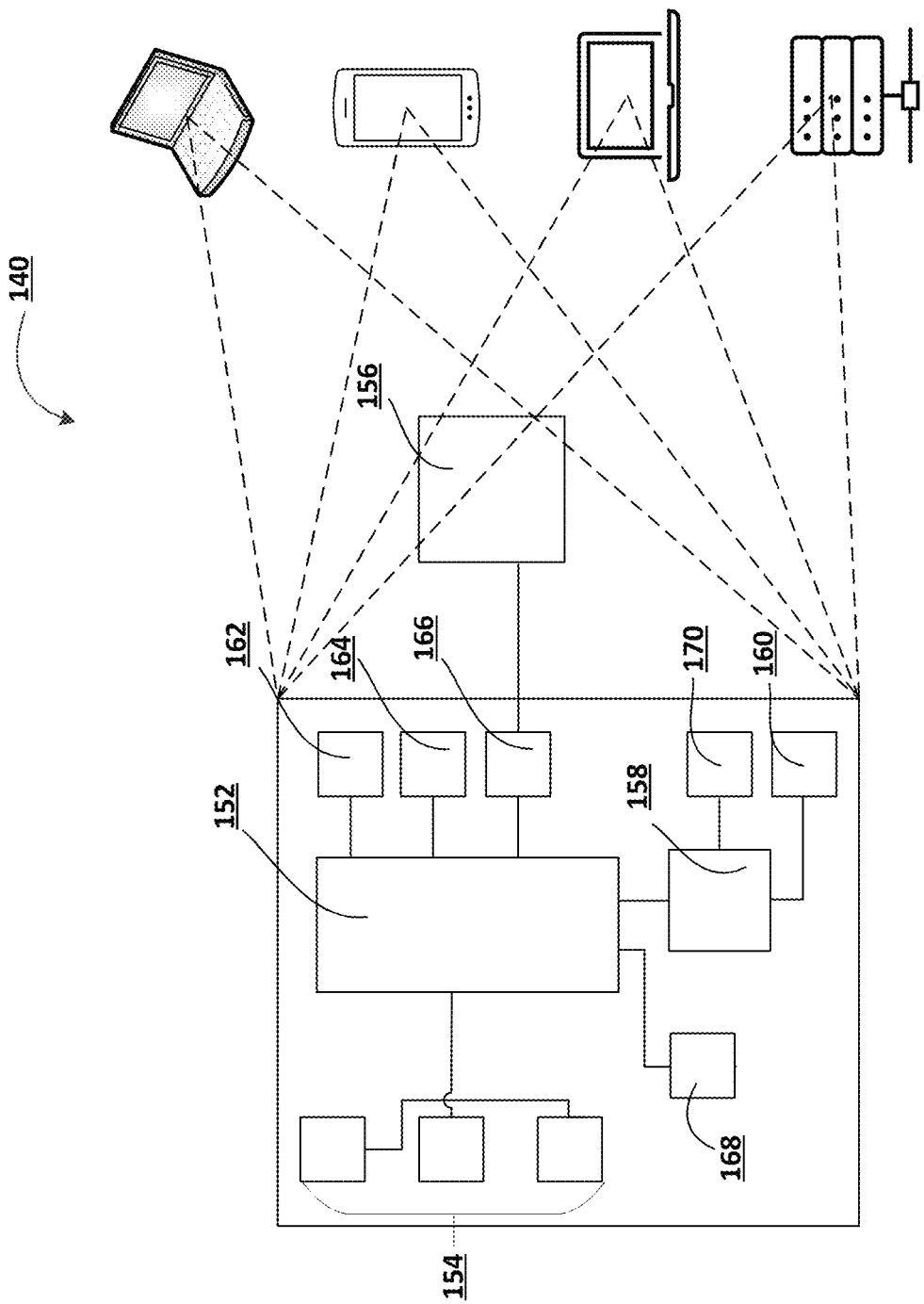
Figure 2:
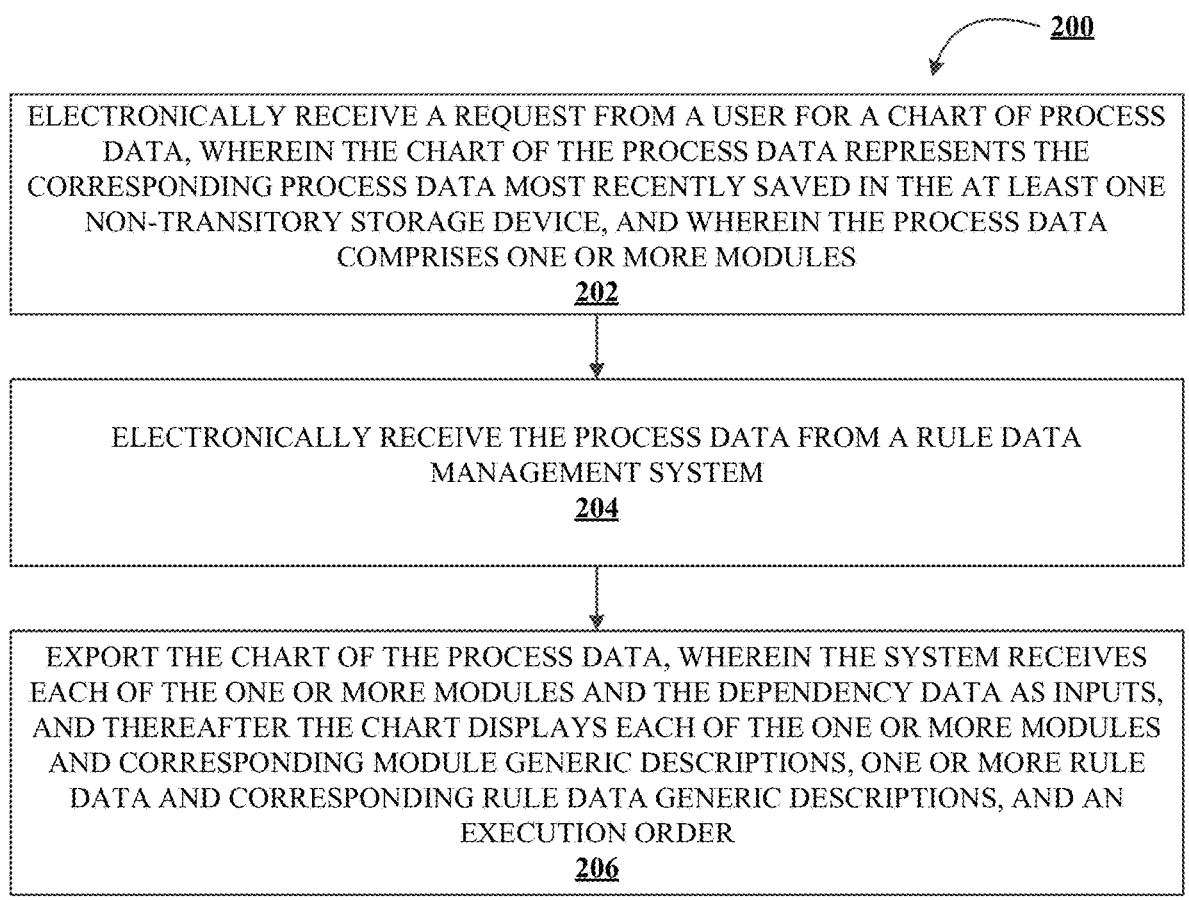
Figure 3:
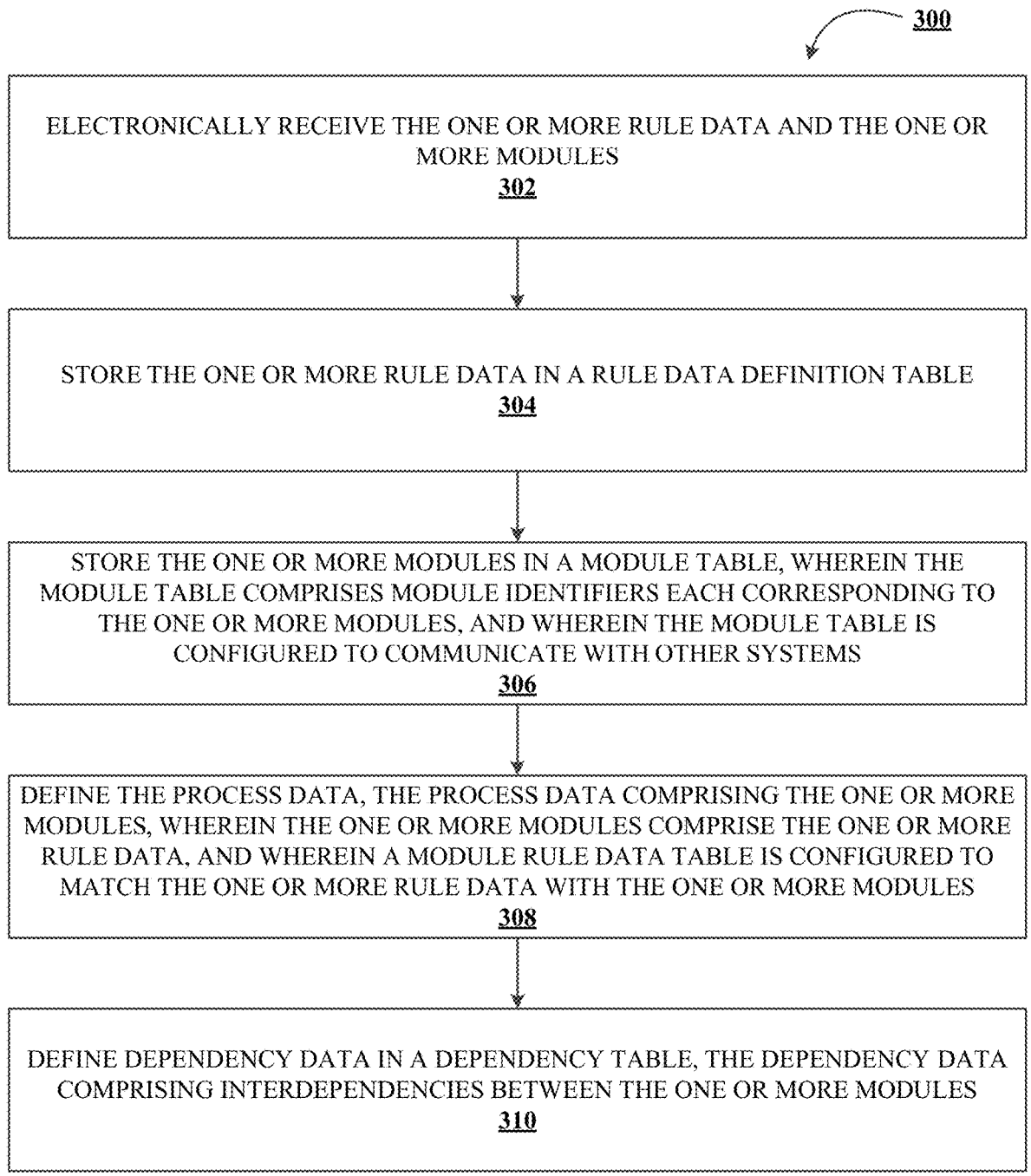
Figure 4:
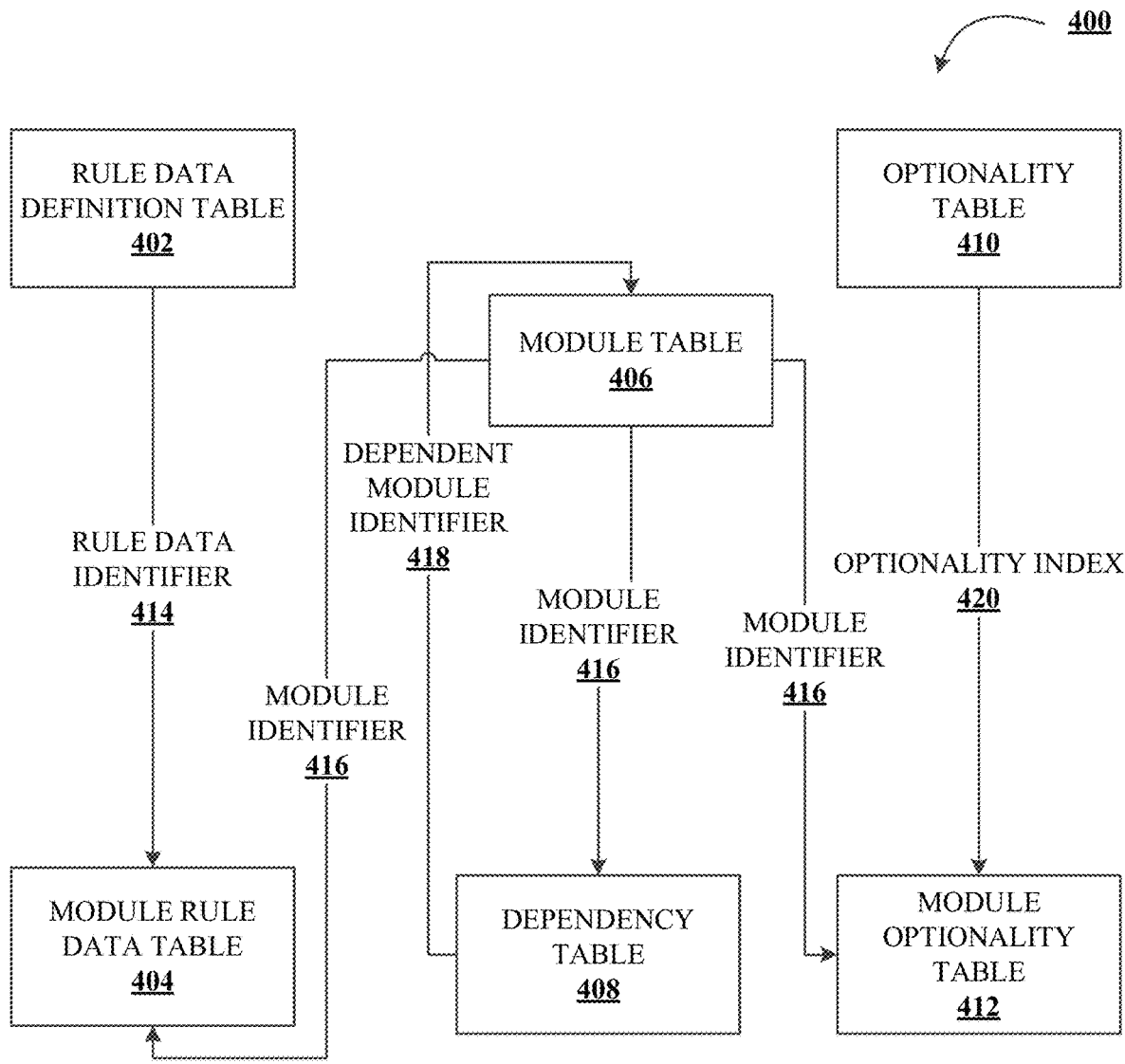

Having thus described embodiments of the invention in general terms, reference will now be made the accompanying drawings, wherein:

FIGS. 1A-1C illustrates technical components of an exemplary distributed computing environment for retrieval and generation of graphical user interface depicting of graphics associated with rules-based data management, in accordance with an embodiment of the invention;

FIG. 2 illustrates a process flow for retrieval and generation of graphical user interface depicting of graphics associated with rules-based data management, in accordance with an embodiment of the invention;

FIG. 3 illustrates a process flow for storing and generating process data in a rule data management system; and FIG. 4 illustrates a flow diagram of a data model for retrieval and generation of graphical user interface depicting of graphics associated with rules-based data management, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "process data" may refer to any data associated with a process within an entity, typically defined by one or work packages or "modules" which are completed independently of one another, the completion of all such modules equivalent to completion of the process. The process data may define numerous applications, entities, users, machines, or other resources to be used for completion of such processes, one or more of which may be assigned to any module therein.

As used herein, "rule data" may refer to any conditional logic which must be affirmatively met prior to any subsequent activity, event, or sequence of events occurring. As applied to the invention described herein, a rule data may describe the operations, definitions, and constraints that apply to an entity, and assert entity control over the behavior of the entity in response to actions taken by users or users associated with the entity. Rule data may be implemented in any number of processes, and the rule data may be provided to comply with local laws, during analysis of operations of an entity, or to provide assistance to users at an entity tasked with developing logic surrounding a process data. Rule data may be contained within a module of process data, or may be shared across multiple modules.

The invention described herein may utilize numerous computer systems and computer applications within an entity to write, store, export, import, and convert process data, rule data, and modules, and characteristics, identifiers, and generic names thereof into viewable graphics for display on a graphical user interface.

Prior to the invention described herein, process data and accompanying rule data were generally updated, changed, or otherwise modified on a frequent basis, leading to outdated documentation of the process data. Moreover, technically complex computer code language is often difficult for users associated with an entity to interpret in order to evaluate the currently rule data or process data quickly and effectively.

The invention disclosed herein provides a novel approach to receiving the most up-to-date process data and rule data within an entity, translated into layman's terms, and presented on a graphical user interface for viewing and interpretation by all. The process data and rule data may be displayed in a simplified manner within pre-formatted documentation templates for easy recognition of such process data and rule data.

Accordingly, in the present invention, a user requests a chart of a process and the rules thereof. The system is configured to generate the chart using the most recent version of the process data and the rule data contained within the process data. The system requests and then receives the process from a rule data management system. The rule data management system stores many processes and process data thereof. Process data are broken down into modules, which contain rule data. Rule data are stored in a rule data definition table with unique identifiers for each rule data, plus generic layman's descriptions for each rule data. Modules are stored in a module table, with unique identifiers for each module, plus generic layman's descriptions for each module. A module rule data table matches the rules with the modules. A module dependency table contains interdependencies between the modules, either in parallel, series, or neither. An optionality table contains groupings of modules and the sequence of modules for the process data. An optionality module table stores the optionality index and the module identifiers. A chart of the process data is exported, wherein the system receives each of the modules (and rule data therein) and the interdependencies as inputs, and thereafter the chart displays each of the modules, rule data, and corresponding generic layman's descriptions and the order of execution in the process data.

What is more, the present invention provides a technical solution to a technical problem. As described herein, the technical problem includes inability to receive the most up-to-date rule data and process data when requested. The technical solution presented herein allows for automated retrieval of current rule data and process data, as well as a conversion of such rule data and process data into easily comprehendible graphical charts or documentation with translations (or "generic descriptions") of each. In particular, allowing easy retrieval of up-to-date rule data and process data by linking rule data and process data in a rule data management system is an improvement over existing solutions to the inability to receive the most up-to-date rule data and process data when requested, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment for retrieval and generation of graphical user interface depicting of graphics associated with rules-based data management 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130)

and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for retrieval and generation of graphical user interface depicting of graphics associated with rules-based data management, in accordance with an embodiment of the invention. The process begins at block 202 electronically receive a request from a user for a chart of process data, wherein the chart of the process data represents the corresponding process data most recently saved in the at least one non-transitory storage device, and wherein the process data comprises one or more modules.

Process data within an entity are generally recorded, monitored, and implemented electronically, such that systems within an entity may follow the rule data which are set forth in each of the process data. For example, rule data may be created and stored for a particular process of electronically opening an account for a user, and the rule data may describe the qualifications of the user required to open an account prior to an entity system allowing such actions, like a certain biographic characteristic of a user, geographic location, or the like. It shall be understood that the types of process data suitable for the invention described herein is not limited to any of the examples described herein, as the system described is agnostic to the type of process data and details of the rule data.

Users associated with an entity may frequently desire to audit, observe, or otherwise receive a chart of the process data for a given process, and entities frequently produce such charts manually. The invention described herein retrieves, or electronically receives, the process data surrounding a process from a rule data management system after the user associated with the entity requests for a chart. The chart may be provided on a graphical user interface of a system, or in some embodiments, the chart may be capable of being printed to a hard copy. Various graphical representations of process data are contemplated. For example, each process data may comprise a graphical block or representative text, with the underlying rule data subsiding within the graphical block. In some embodiments, the process data may also describe the individual modules and/or rule data with "plain language" or layman's terms for each of the process data or rule data, such that individuals not familiar with computer code may be able to interpret the exact inputs, outputs, rule data thresholds, or the like for each of the modules and/or rule data.

In contrast to commonly used methods for producing such charts, the invention described herein is able to retrieve the latest or most recent version of each of the rule data, process data, modules, or any underlying components thereof, so that after a user electronically requests a chart for process data of a process, the system displays the most up-to-date version of the process, thereby eliminating the challenges associated with revision control of documentation which receives frequent updates or revisions.

The retrieval of process data in the present invention allows for receipt of data of various process data and conversion into a common chart data type, such as standard word processing formats, spreadsheet formats, or text formats applied to standardized document templates provided by the entity. By converting such data into these standardized formats, process data may be manipulated, compared, reformatted, repackaged, or otherwise utilized by various users in process data comparison exercises.

The process continues in block 204, where the system receives the process data from a rule data management system. As will be discussed in greater detail herein, the process data may be comprised of one or more rule data, and may be stored in a rule data management system. A user, user associated with the entity, or the like may provide the system with any number of rule data for a process, such as the previous examples where a rule data is requested to be defined for the account creation of a user. This may be a new rule data which has been generated specifically for a system, or in some embodiments the rule data may be modified by a user associated with the entity and as such the user associated with the entity modifies the rule data and thereafter the repository is updated with a new revision of a rule data.

A rule data management system is a software system used to store, define, and deploy and/or monitor rule data within the entity. The rule data management system may include a repository for storing rule data, tools to allow software developers or other users associated with the entity to manage the rule data and logic thereof, and a runtime environment.

The rule data management system will be described in detail here at FIGS. 3-4. In some embodiments, the rule data management system may implement a pattern-matching algorithm such as a Rete algorithm as a method for implementing a forward and backward chaining rule data algorithm. The rule data management system is configured to receive a coding language from a user associated with an entity, such as Java or any other type of programming language such as C/C++.

The process continues in block 206, where the system exports the chart of the process data, wherein the system receives each of the one or more modules and dependency data as inputs, and thereafter the chart displays each of the one or more modules and corresponding module generic descriptions, one or more rule data and corresponding rule data generic descriptions, and an execution order.

As previously described, the system herein solves a recurring challenge related to users associated with an entity who have a vested interest in learning from, auditing, or otherwise viewing process data, but such users being unable to interpret such process data due to inability to interpret the technically challenging or otherwise obfuscated computer coding. Moreover, such users associated with the entity desire to be presented with the most up-to-date process data as stored in one or more memory devices of the system. Thus, the present system displays graphically, on a user interface, modules and rule data. In some embodiments, the modules may be arranged in a Gantt chart-style format, where outputs of one module are directed to inputs of one or more modules. The modules may be displayed as graphical icons, or in some embodiments merely text. In yet additional embodiments, the system may be configured to display the modules in a pre-formatted documentation template, such that the export of the chart is parsed by the system and modules, rule data, and any other attributes may be insert into a word processing document such as to comply with an entity's standardized documentation format or other formatting required by regulatory bodies.

In some embodiments, accompanying one or more modules may be module generic descriptions corresponding with the one or more modules. These descriptions provide the users associated with the entity who view the chart of the process data a more easily recognizable word, phrase, sentence, or description of the one or more modules. For example, the underlying computer code for a particular module may comprise a complex table, series of rule data, or code, and yet the system will simply provide "Process A" to the viewer. In some embodiments, accompanying one or more rule data may be rule data generic descriptions corresponding with the one or more rule data. These descriptions provide the users associated with the entity who view the chart of the process data a more easily recognizable word, phrase, sentence, or description of the one or more rule data. For example, the underlying computer code for a particular rule data may comprise a rule data such as "If A>10, then B", and yet the system will simply provide "A must be greater than 10" to the viewer.

Furthermore, in some embodiments the execution order of the process data is displayed graphically, such that a viewer will be able to visually identify that a first module is to be completed prior to initiation of a second module (e.g., in "series"), or in some embodiments that both the first and second modules are executed together (e.g., in "parallel"). This may be displayed graphically as modules being connected via lines or other connectors. In yet additional embodiments, the system may display graphically that a first module and a second module must finish simultaneously, regardless of the respective durations of each of the modules, and that a subsequent third module is dependent on the finish of both modules. In yet additional embodiments, the system may display graphically that a first module and a second module must start simultaneously, regardless of the respective durations of each of the modules, and that a subsequent third module is dependent on the finish of both modules.

FIG. 3 illustrates a process flow 300 for storing and generating process data in a rule data management system, in accordance with an embodiment of the invention. As previously described, the system interacts with the rule data management system to retrieve the most up-to-date module data, rule data, process data, or the like. In order to do so, integration with the rule data management system is key. In this way, when the system receives a request from a user for a chart of a process data, process data is received from the rule data management system in an orderly, organized, and complete fashion. The process flow begins at block 302, wherein the rule data management system electronically receives the one or more rule data and the one or more modules.

Each rule data may be provided to the system, the system configured to electronically receive such rule data such that a particular process data may ultimately be defined of one or more modules comprising rule data. A rule data which may be associated with a module may be, as one non-limiting example, "only obtain a recipient's address if the recipient is a current subscriber." Another non-limiting example of a rule data may be a rule which may be associated with a module such as "apply one postage stamp if the document is less than 20 pages, but apply two postage stamps if the document is 20 pages or more."

Each module may represent a distinct step of a process, and the system may be configured to electronically receive such modules. The system forms one or more modules from the process data, wherein each of the one or more modules comprise a portion of the process data and a full package name of the process data. In order to facilitate the interdependencies of rule data, it is advantageous for the system to parse the process data into various modules which are discreet from one another. As previously described, each process data comprises one or more rule data, and as such, the separation of the process data into modules allows for separation of rule data.

As one non-limiting example illustrates, a process where a letter is mailed through automation, the process may be broken down into modules, or "steps", such as (1) obtaining the recipient's address, (2) printing the address on an envelope, (3) printing the letter with the recipient's address and name on the letter, (4) applying a postage stamp, and so forth.

The process continues in block 304, where the system stores the one or more rule data in a rule data definition table. The rule definition table may be any electronic database, table, or chart configured to store rule data and data thereof. The rule data definition table may also be configured to receive and store the rule data generic description(s) for the one or more rule data stored in the rule data definition table. In some embodiments, additional characteristics for each rule data may be defined, such as a rule data identifier (a unique alphanumeric number or code associated with each rule data), a rule data type (to identify different categories of rules), and a rule data name (a user-defined alphanumeric name to provide a quick reference to a user to identify each rule data).

The process continues at block 306, where the system stores the one or more modules in a module table, wherein the module table comprises module identifiers each corresponding to the one or more modules, and wherein the module table is configured to communicate with the other systems. Similar to the rule definition table, the module table may be any electronic database, table, or chart configured to store modules and data thereof. The module table may also be configured to receive and store the module generic description(s) for the one or more modules stored in the module table. In some embodiments, additional characteristics for each module may be defined, such as a module identifier (a unique alphanumeric number or code associated with each module), and a module name (a user-defined alphanumeric name to provide a quick reference to a user to identify each module).

In some embodiments, the module table may be configured to integrate, communicate, or otherwise direct multiple computer programs to execute a module. It shall be appreciated that a process data within an entity may involve a plurality of computer programs, each of which may be responsible for executing a particular segment or portion of an overall process data. As such, the module table may function as an adapter to notify and/or trigger other computer programs to execute a particular module.

The process continues at block 308, where the system defines the process data, the process data comprising the one or more modules, wherein the one or more modules comprise the one or more rule data, and wherein a module rule data table is configured to match the one or more rule data with the one or more modules. As previously described, each module may comprise one or more rule data. For the system to properly assign and match a rule data with a module, a module rule data table may be used to create associations between the module identifier and the rule data identifier. The module rule data table may be any electronic database, table, or chart configured to store data, such as to link the rule data definition table (and rule data therein), with the module table (and module data therein). The module rule data table may store rule data based on category, rule data identifier, or module identifier. In this way, when a module is executed, the system recognizes which rule data must also be executed within each of the modules.

In some embodiments the module rule data table may also store data from an optionality table, which comprises an optionality index for any given application programming interface ("API"). In this way, the optionality table groups modules together with a sequence, and as such a process data ultimately can be executed based on the sequence of the underlying modules. In some embodiments, a module optionality table may also be provided, the module optionality table configured to group one or more modules with other modules, via creating associations between the module identifier and optionality index provided to the module optionality table by the optionality table.

The process continues in block 310, where the system defines dependency data in a dependency table, the dependency data comprising interdependencies between the one or more modules. The dependency table may be any electronic database, table, or chart configured to store data, such as data to define whether one or more modules can be executed in parallel with another module, or whether the one or more modules should be executed in series with another module. The dependency data in the dependency table may comprise a dependent module identifier. This dependent module identifier may be provided to the module table to link the modules stored in the module table with the dependency data stored in the dependency table.

FIG. 4 illustrates a flow diagram 400 of a data model for retrieval and generation of graphical user interface depicting of graphics associated with rules-based data management, in accordance with an embodiment of the invention. The rule data definition table 402 may provide the rule data identifier 414 to the module rule data table 404.

In some embodiments, the module table 406 may provide the module identifier 416 to the module rule data table 404. The module identifier 406 is a unique alphanumeric number or code associated with each module. As such the module identifier 406 may be used across at least one of the module rule data table 404, the dependency table 408, and the module optionality table 412, the module identifier 406 creating a singular reference to the same module across each of the tables in which it is used.

In some embodiments, the module table 406 may receive the dependent module identifier 418 from the dependency table 408 and provide the module identifier 416 to dependency table 408. The dependent module identifier 418 is a unique alphanumeric number or code associated with a module which identifies other modules upon which the given module is dependent. In this way, when a given module is identified for execution, the modules upon which the given is dependent, and those which are dependent on the given module, are similarly identified. Depending on the process data, these other modules may also be executed.

In some embodiments, the module table 406 may provide the module identifier 416 to the module optionality table 412. In some embodiments, the module optionality table 412 may receive the optionality index 420 from optionality table 410. The optionality index 420 provides data to the module optionality table 412 regarding the groupings of particular modules and sequencing of said modules for a given process data.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for retrieval and generation of graphical user interface depicting of graphics associated with rules-based data management, the system comprising:
   at least one non-transitory storage device; and
   at least one processor coupled to the at least one non-transitory storage device, wherein the at least one processor is configured to:
   electronically receive a request from a user for a chart of process data, wherein the chart of the process data represents the corresponding process data most recently saved in the at least one non-transitory storage device, and wherein the process data comprises one or more modules;
   electronically receive the process data from a rule data management system; and
   export the chart of the process data, wherein the system receives each of the one or more modules and dependency data as inputs, and thereafter the chart displays each of the one or more modules and corresponding module generic descriptions, one or more rule data and corresponding rule generic descriptions, and an execution order,
   wherein the rule data management system is configured to:
      electronically receive the one or more rule data and the one or more modules;
      store the one or more rule data in a rule definition table;

store the one or more modules in a module table, wherein the module table comprises module identifiers each corresponding to the one or more modules, and wherein the module table is configured to communicate with other systems;

define the process data, the process data comprising the one or more modules, wherein the one or more modules comprise the one or more rule data, and wherein a module rule table is configured to match the one or more rule data with the one or more modules; and define the dependency data in a dependency table, the dependency data comprising interdependencies between the one or more modules.

2. The system of claim 1, wherein the rule data management system is further configured to:

store in an optionality table a grouping of modules and a sequence of modules for the process data, wherein the optionality table comprises an optionality index; and store in a module optionality table the optionality index and the module identifiers.

3. The system of claim 1, wherein the rule data management system is configured to store a plurality of process data.

4. The system of claim 1, wherein the rule data management system is further configured to:

receive, from the user, the module generic descriptions for the one or more modules; and store the module generic description in the module table.

5. The system of claim 1, wherein the rule data management system is further configured to:

receive, from the user, the rule generic descriptions for the one or more rule data; and store the rule generic description in the rule definition table.

6. The system of claim 1, wherein the interdependencies are defined as the one or more modules in parallel, series, or neither.

7. A computer program product for retrieval and generation of graphical user interface depicting of graphics associated with rules-based data management, the computer program product comprising a non-transitory computer-readable medium comprising code causing an apparatus to:

electronically receive a request from a user for a chart of process data, wherein the chart of the process data represents the corresponding process data most recently saved in at least one non-transitory storage device, and wherein the process data comprises one or more modules;

electronically receive the process data from a rule data management system; and export the chart of the process data, wherein the computer program product receives each of the one or more modules and dependency data as inputs, and thereafter the chart displays each of the one or more modules and corresponding module generic descriptions, one or more rule data and corresponding rule generic descriptions, and an execution order, wherein the rule data management system is configured to:

electronically receive the one or more rule data and the one or more modules;

store the one or more rule data in a rule definition table;

store the one or more modules in a module table, wherein the module table comprises module identifiers each corresponding to the one or more modules, and wherein the module table is configured to communicate with other systems;

define the process data, the process data comprising the one or more modules, wherein the one or more modules comprise the one or more rule data, and wherein a module rule table is configured to match the one or more rule data with the one or more modules; and define the dependency data in a dependency table, the dependency data comprising interdependencies between the one or more modules.

8. The computer program product of claim 7, wherein the rule data management system is further configured to:

store in an optionality table a grouping of modules and a sequence of modules for the process data, wherein the optionality table comprises an optionality index; and store in a module optionality table the optionality index and the module identifiers.

9. The computer program product of claim 7, wherein the rule data management system is configured to store a plurality of process data.

10. The computer program product of claim 7, wherein the rule data management system is further configured to:

receive, from the user, the module generic descriptions for the one or more modules; and store the module generic description in the module table.

11. The computer program product of claim 7, wherein the rule data management system is further configured to:

receive, from the user, the rule generic descriptions for the one or more rule data; and store the rule generic description in the rule definition table.

12. The computer program product of claim 7, wherein the interdependencies are defined as the one or more modules in parallel, series, or neither.

13. A method for retrieval and generation of graphical user interface depicting of graphics associated with rules-based data management, the method comprising:

electronically receiving a request from a user for a chart of process data, wherein the chart of the process data represents the corresponding process data most recently saved in at least one non-transitory storage device, and wherein the process data comprises one or more modules;

electronically receiving the process data from a rule data management system; and exporting the chart of the process data, wherein a system receives each of the one or more modules and dependency data as inputs, and thereafter the chart displays each of the one or more modules and corresponding module generic descriptions, one or more rule data and corresponding rule generic descriptions, and an execution order, wherein the rule data management system is configured to:

electronically receive the one or more rule data and the one or more modules;

store the one or more rule data in a rule definition table;

store the one or more modules in a module table, wherein the module table comprises module identifiers each corresponding to the one or more modules, and wherein the module table is configured to communicate with other systems;

define the process data, the process data comprising the one or more modules, wherein the one or more modules comprise the one or more rule data, and wherein a module rule table is configured to match the one or more rule data with the one or more modules; and define the dependency data in a dependency table, the dependency data comprising interdependencies between the one or more modules.

14. The method of claim 13, wherein the rule data management system is further configured to:

store in an optionality table a grouping of modules and a sequence of modules for the process data, wherein the optionality table comprises an optionality index; and store in a module optionality table the optionality index and the module identifiers.

15. The method of claim 13, wherein the rule data management system is further configured to:

receive, from the user, the module generic descriptions for the one or more modules; and store the module generic description in the module table.

16. The method of claim 13, wherein the rule data management system is further configured to:

receive, from the user, the rule generic descriptions for the one or more rule data; and store the rule generic description in the rule definition table.

17. The method of claim 13, wherein the interdependencies are defined as the one or more modules in parallel, series, or neither.

* * * * *